(12) United States Patent
Halama

(10) Patent No.: US 11,644,411 B2
(45) Date of Patent: May 9, 2023

(54) WINDOW CONTAMINATION SENSOR

(71) Applicant: Rosemount Aerospace Inc., Burnsville, MN (US)

(72) Inventor: Gary Halama, Rosemount, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 100 days.

(21) Appl. No.: 17/350,715

(22) Filed: Jun. 17, 2021

(65) Prior Publication Data

US 2022/0404266 A1   Dec. 22, 2022

(51) Int. Cl.
*G01N 21/15* (2006.01)
*B64D 43/00* (2006.01)

(52) U.S. Cl.
CPC ............. *G01N 21/15* (2013.01); *B64D 43/00* (2013.01); *G01N 2021/157* (2013.01)

(58) Field of Classification Search
CPC ... G01N 21/15; G01N 2021/157; B64D 43/00
USPC .................................................. 356/432–448
See application file for complete search history.

(56) References Cited

U.S. PATENT DOCUMENTS

| | | | |
|---|---|---|---|
| 5,812,270 A | 9/1998 | Hampton et al. | |
| 5,991,049 A | 11/1999 | Tanaka et al. | |
| 6,330,464 B1 * | 12/2001 | Colvin, Jr. ......... | G01N 21/7703 128/903 |
| 7,245,367 B2 | 7/2007 | Miller et al. | |
| 7,948,628 B2 | 5/2011 | Laluvein et al. | |
| 10,161,886 B2 | 12/2018 | Ohlsson et al. | |
| 10,654,450 B2 | 5/2020 | Tilleman et al. | |
| 2018/0029563 A1 | 2/2018 | Beloe et al. | |

FOREIGN PATENT DOCUMENTS

| | | |
|---|---|---|
| DE | 4102146 C1 | 9/1991 |
| DE | 102011083455 A1 | 9/2012 |
| DE | 102018220269 B3 | 3/2020 |
| DE | 102018217467 A1 | 4/2020 |

OTHER PUBLICATIONS

Extended European Search Report for EP Application No. 22178899.5, dated Nov. 2, 2022, 8 pages.

* cited by examiner

*Primary Examiner* — Tri T Ton
(74) *Attorney, Agent, or Firm* — Kinney & Lange, P.A.

(57) ABSTRACT

A contamination sensor for an optical sensor observation window includes a source, two prisms, a detector, and a controller. The source can emit a collimated light beam at an incident angle that is greater than a critical angle of an interface between a fluid and the window. The window has a refractive index greater than the refractive index of the fluid. The prisms can direct the collimated light beam within the window such that the collimated light beam reflects within a contamination detection zone of the window. The detector can receive the collimated light beam. The controller can communicate with the source and detector. The controller can calculate an emission/detection ratio defined by a difference between an amount of light emitted by the source and an amount of light that passes from the source to the detector by a total internal reflectance of the window.

20 Claims, 8 Drawing Sheets

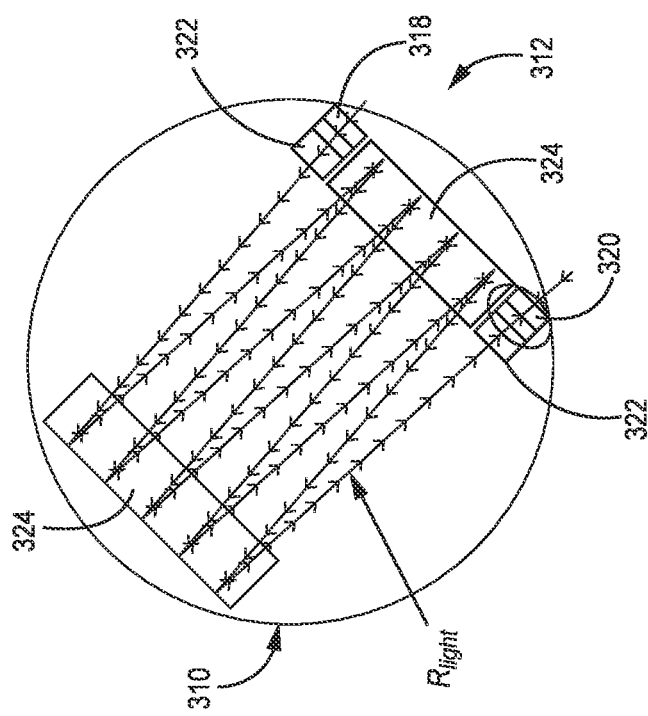
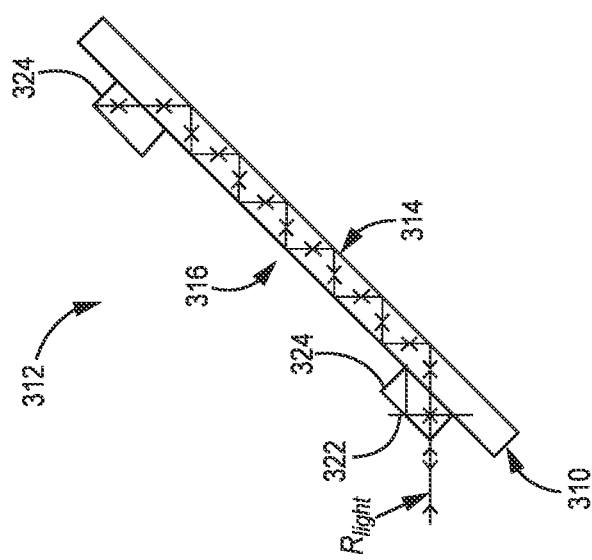
FIG. 7A
FIG. 7B

WINDOW CONTAMINATION SENSOR

BACKGROUND

The present disclosure relates generally to sensors and more specifically to optical sensors for aircraft.

Optical sensors used on an aircraft will have a window to view the exterior environment. This window is exposed to the elements on the outside of the aircraft and can become obscured by dirt, aviation de-icing fluid, grease, oil, fuel, water droplets, ice or other contaminants. Contaminants on the surface of an observation window can drastically reduce the accuracy and reliability of readings taken with an optical sensor. Current optical sensor observation windows do not use sensors to measure the cleanliness of the window, requiring manual inspections of the outer surface of the window while the aircraft is not in use. Other applications of contamination sensors monitor only a small area of the total window.

SUMMARY

According to one aspect of the present invention, a contamination sensor for an optical sensor observation window includes a source, a first prism, a second prism, a detector, and a controller. The source is configured to emit a collimated light beam at an incident angle that is greater than a critical angle of an interface between a fluid and the optical sensor observation window. The optical sensor observation window is made from a material having a refractive index greater than the refractive index of the fluid. The source is configured to communicate emission data about the collimated light beam with the controller. The first and second prisms are in contact with the optical sensor observation window. The first prism is configured to direct the collimated light beam into the optical sensor observation window such that the collimated light beam reflects between a first surface of the optical sensor observation window and a second surface of the optical sensor observation window within a contamination detection zone of the optical sensor observation window. The second prism is located along a beam path of the collimated light beam. The second prism is configured to receive the collimated light beam after the collimated light beam has been reflected between the first surface of the optical sensor observation window and the second surface of the optical sensor observation window within the contamination detection zone of the optical sensor observation window. The detector is configured to receive the collimated light beam from the second prism and communicate reflectance data about the collimated light beam with the controller. The controller is configured to calculate an emission/detection ratio which is defined by a difference between an amount of light that is emitted by the source and an amount of light that passes from the source to the detector by a total internal reflectance of the optical sensor observation window.

According to another aspect of the present invention, a system for detecting contaminants on an optical sensor observation window includes the optical sensor observation window and the above-described contamination sensor.

According to yet another aspect of the present invention, a method of detecting contaminants on an optical sensor observation window includes emitting, with a source, a collimated light beam at an incident angle that is greater than a critical angle of an interface between a fluid and the optical sensor observation window. The optical sensor observation window is made from a material having a refractive index greater than the refractive index of the fluid. A first prism in contact with the optical sensor observation window directs the collimated light beam. The collimated light beam is reflected between a first surface of the optical sensor observation window and a second surface of the optical sensor observation window within a contamination detection zone of the optical sensor observation window. A second prism, which is in contact with the optical sensor observation window and is located along a beam path of the collimated light beam, receives the collimated light beam which has been reflected between the first surface of the optical sensor observation window and the second surface of the optical sensor observation window within the contamination detection zone of the optical sensor observation window. A detector receives the collimated light beam from the second prism. Emission data about the collimated light beam is communicated between the source and a controller. Reflectance data about the collimated light beam which has been reflected within the contamination detection zone is communicated between the detector and the controller. The controller calculates an emission/detection ratio which is defined by a difference between an amount of light that is emitted by the source and an amount of light that passes from the source to the detector by a total internal reflectance of the optical sensor observation window.

BRIEF DESCRIPTION OF THE DRAWINGS

FIG. 7A is a side view ray trace diagram of a center ray reflecting through the circular window of FIG. 6.

FIG. 7B is a top view ray trace diagram of a center ray reflecting through the circular window of FIG. 6.

DETAILED DESCRIPTION

A contamination sensor is included in an observation window for an optical sensor which emits a laser or other collimated light source. The sensor detects contaminants on the surface of the window by using total internal reflectance and measuring any loss in signal across the window.

Figure 1:
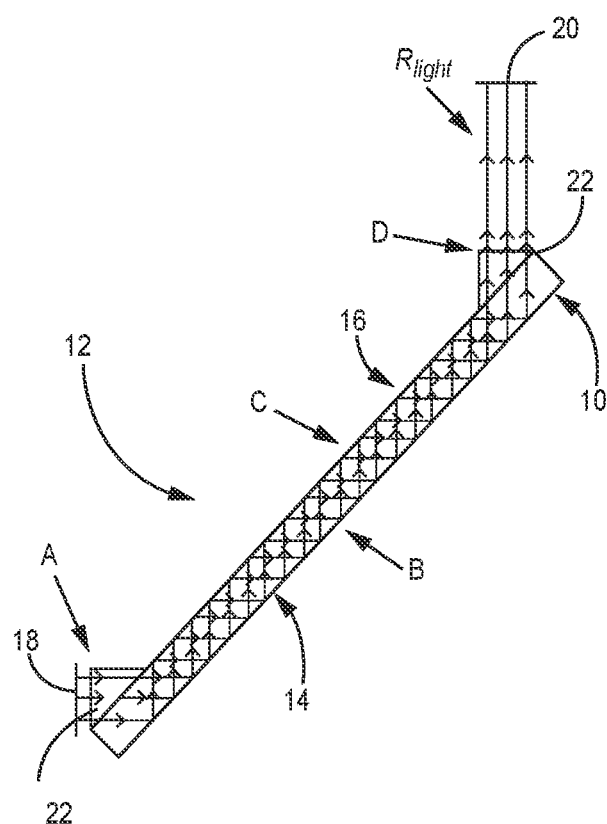
FIG. 1 is a simplified ray trace diagram of light rays reflecting through a window.

FIG. 1 is a simplified ray trace diagram of rays $R_{light}$ reflecting through window 10 via contamination sensor 12. Window 10 has an outer surface 14 and an inner surface 16. Contamination sensor 12 includes source 18, detector 20, and prisms 22. In the example depicted in FIG. 1, contamination sensor 12 includes two prisms 22.

Window 10 is made from a material having a refractive index greater than the refractive index of a fluid (as described below) that comes into contact with the window 10. For example, window 10 can be made of glass which has a refractive index of approximately 1.5. Source 18 is a light source which emits a collimated light beam, such as a laser, a light emitting diode (LED), a filament, or a lamp. It should be understood that if source 18 is not a laser, additional components may be necessary to ensure that the light emitted from source 18 is collimated. In the example depicted in FIG. 1, source 18 emits a collimated light beam as rays $R_{light}$. Detector 20 can be a single photodiode, an avalanche photodiode, or an array of photodiodes. Detector 20 receives rays $R_{light}$ which have been emitted from source 18 and can measure data about the received rays $R_{light}$. After being emitted by source 18, rays $R_{light}$ interact with window 10 at locations such as locations A-D before being received by detector 20. Prisms 22 are optically polished glass prisms which, in the depicted example, are right angle triangular prisms. Prisms 22 are in contact with window 10. The first prism 22 can direct rays $R_{light}$ emitted by source 18 into window 10. The second prism 22 is along a ray path of rays $R_{light}$ and directs rays $R_{light}$ into detector 20.

Where window 10 comes into contact with a fluid, such as along outer surface 14 or inner surface 16, there is a glass-fluid interface. Outer surface 14 and inner surface 16 of window 10 can be in contact with a fluid such as air or water during use. Fluids such as air and water have a lower refractive index than glass, and light that is incident on the glass-fluid interface is traveling from a material with a higher refractive index (glass) to a material with a lower refractive index (fluid such as air or water). If the incident light has an angle of incidence which is greater than a critical angle of the glass-fluid interface, the incident light will undergo total internal reflectance (TIR) within the glass. The critical angle of a glass-air interface is given by:

$$\theta_C = \arcsin\left(\frac{n_{AIR}}{n_{GLASS}}\right) = \arcsin\left(\frac{1}{1.5}\right)$$

where $n_{AIR}$ is the refractive index of air (about 1), $n_{GLASS}$ is the refractive index of glass (about 1.5), and $\theta_C$ is the critical angle of the interface (about 41.81 degrees). TIR can be frustrated by placing another surface in contact with a surface of window 10, such as prisms 22 which are in contact with inner surface 16 of window 10. Frustrated TIR results in a light ray exiting the glass instead of continuing to reflect internally within the glass.

A light ray with an angle of incidence which is greater than critical angle $\theta_C$ (i.e. a light ray which is incident on the glass-air interface at an angle greater than $\theta_C$) results in the incident light totally reflecting within the window at numerous points, as described in more detail below. If there are no contaminants present on the surface of window 10, all of the light emitted by source 18 will be received by detector 20.

At location A, rays $R_{light}$ pass through one of prisms 22 and enter window 10 at an angle of incidence of 0 degrees. Rays $R_{light}$ travel through window 10 and are reflected at numerous points, such as locations B and C. Rays $R_{light}$ can reflect off of a first surface and a second surface, such as outer surface 14 and inner surface 16. At locations B and C, rays $R_{light}$ are incident on the glass-air interfaces at an angle of incidence of 45 degrees. Because this angle of incidence is greater than critical angle $\theta_C$ of the glass-air interface, rays $R_{light}$ undergo TIR within window 10. At location D, the TIR of rays $R_{light}$ is frustrated by one of prisms 22, and rays $R_{light}$ exit window 10 and are received by detector 20. Detector 20 can measure the amount of light from the rays $R_{light}$ which are received, as well as other reflectance data about the rays $R_{light}$ which are received.

Figure 2B:
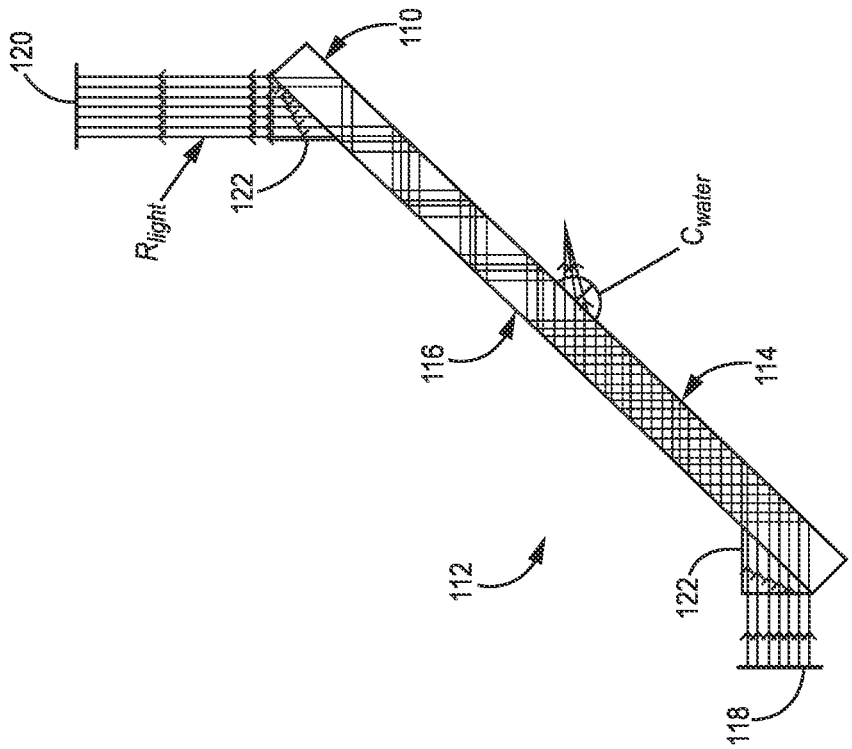
FIG. 2B is a ray trace diagram of light rays reflecting through a window having a water rivulet on the surface.
Figure 2A:
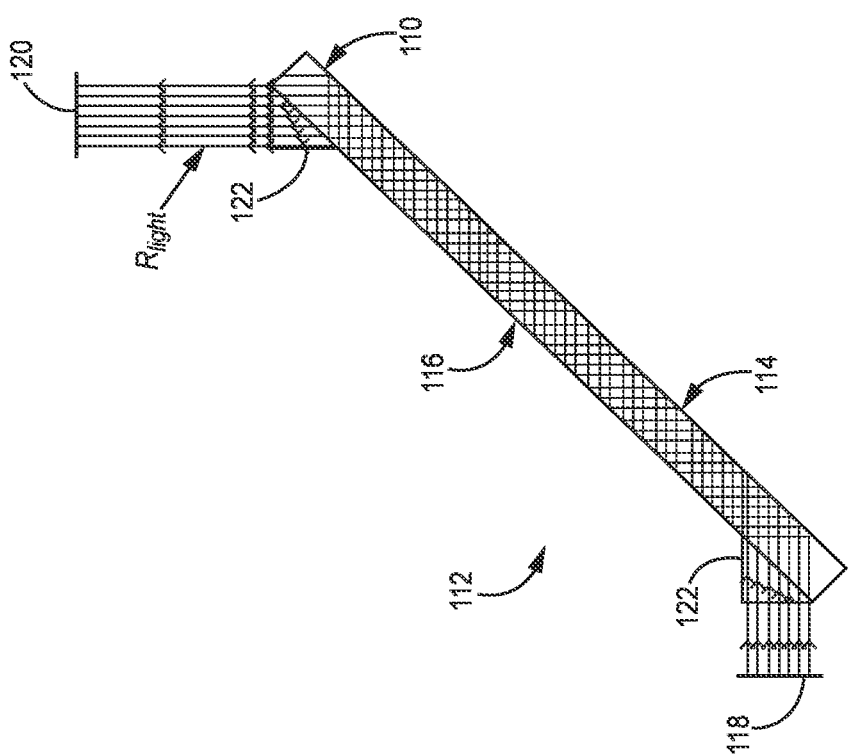
FIG. 2A is a ray trace diagram of light rays reflecting through a window without contamination.

FIGS. 2A-2B are ray trace diagrams of contamination sensor 112 causing rays $R_{light}$ to undergo TIR within window 110. FIGS. 2A-2B will be discussed together. Window 110 includes outer surface 114 and inner surface 116. Contamination sensor 112 includes source 118, detector 120, and prisms 122. In the example depicted, contamination sensor 112 includes two prisms 122. Contamination sensor 112 can include a controller (not shown).

The controller can include a memory unit, one or more processors, and one or more communication devices. The memory unit can be configured to store information within the controller during operation, and can be a computer-readable storage medium which includes a non-transitory medium. The one or more processors can be configured to implement functionality and/or process instructions for execution within the controller. The one or more communication devices can be configured to communicate with external devices via one or more networks, such as one or more wireless or wired networks or both. The controller can additionally include components such as an input device, output device, sensor system, and/or power source.

The controller can be configured to receive and carry out instructions for the operation and configuration of components within contamination sensor 112. For example, the controller can be configured to communicate with the source 118 and the detector 120 to calculate the amount of light received by detector 120 and the amount of light emitted by source 118. Source 118 can communicate, to the controller, emission data about the rays $R_{light}$ emitted by source 118. Detector 120 can communicate, to the controller, reflectance data about the rays $R_{light}$ received by detector 120. The controller can be further configured to calculate an emission/detection ratio. The emission/detection ratio is the percentage of light emitted by source 118 which is received by detector 120. For example, an emission/detection ratio of 90% would indicate that 90% of the light emitted by source 118 was received by detector 120.

The controller can be configured to select a threshold value which represents a level of contaminants present on window 110, and can further be configured to compare the threshold value to the emission/detection ratio to compute a contamination index. The contamination index is the difference between the threshold value and the emission/detection ratio. The controller can be configured to, for example, trigger an alert when the contamination index is greater than zero (i.e., the emission/detection ratio is below the selected threshold value).

The controller can be configured to automatically detect conditions, such as contaminants on outer surface 114, and carry out pre-determined instructions based on the detected conditions. Additionally and/or alternatively, the controller can be configured to carry out instructions from a user, such as selections of or adjustments to the threshold value. Finally, the controller can be configured to periodically detect conditions, such as contaminants on outer surface 114, at selected time intervals. For example, the controller can be configured to assess the emission/detection ratio and/or the contamination index every five minutes during flight.

In the examples depicted in FIG. 2A-2B, window 110 is an observation window for an optical sensor of an aircraft. The contamination sensor 112 on window 110 operates in substantially the same way as the example described above with respect to FIG. 1. FIG. 2A illustrates a window 110 which has no contaminants on the outer surface 114, and FIG. 2B illustrates a window 110 having sufficient contaminants on the outer surface 114 to divert a portion of rays $R_{light}$ out of window 110. The contaminant $C_{water}$ in FIG. 2B is a water rivulet. Because contaminant $C_{water}$ is in contact with outer surface 114, $C_{water}$ frustrates the TIR of a portion of rays $R_{light}$ and causes that portion of rays $R_{light}$ to exit window 110.

Figure 3:
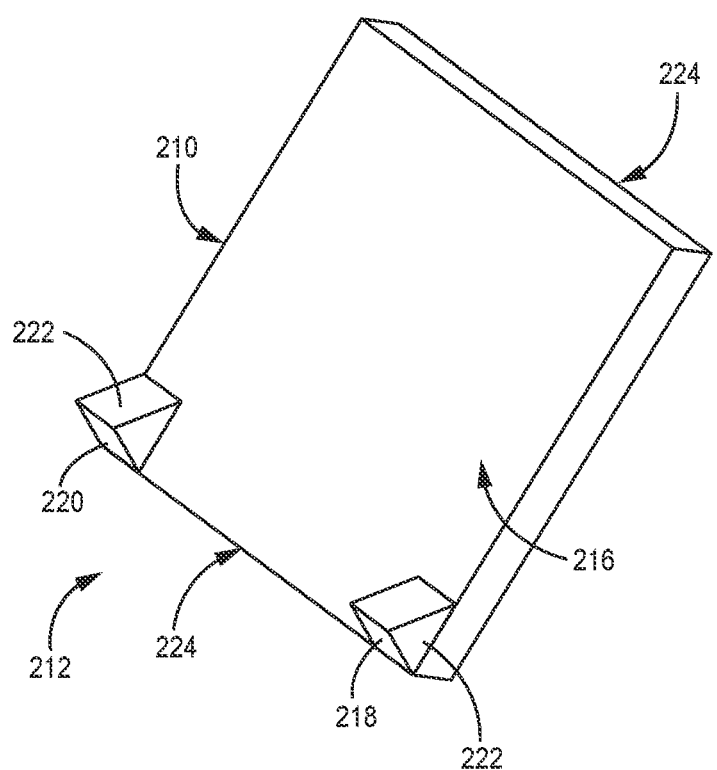
FIG. 3 is a perspective view of a rectangular window with polished edges and two prisms.

FIG. 3 is a perspective view of contamination sensor 212 on window 210. Window 210 includes outer surface 214 (shown in FIG. 4A), inner surface 216, and polished edges 224. Contamination sensor 212 includes source 218, detector 220, and prisms 222. Contamination sensor 212 can include a controller (not shown).

Window 210 is a rectangular window made of glass, such as BK7 (a borosilicate glass). Outer surface 214 and inner surface 216 can be polished. Contamination sensor 212 within window 210 operates in substantially the same way as described above in reference to FIG. 1. Polished edges reflect rays $R_{light}$ (shown in FIGS. 4A-4C), thereby keeping rays $R_{light}$ within window 210. As described in more detail below, polished edges 224 allow rays $R_{light}$ to complete a path across a portion of window 210 by reflecting rays $R_{light}$ along several repeating paths formed by rays $R_{light}$ reflecting between outer surface 214 and inner surface 216. Polished edges 224 allow window 210 to be mounted while preserving the TIR of window 210. Mounting can ordinarily frustrate TIR by putting the window 210 in direct contact with another surface.

Figure 4A:
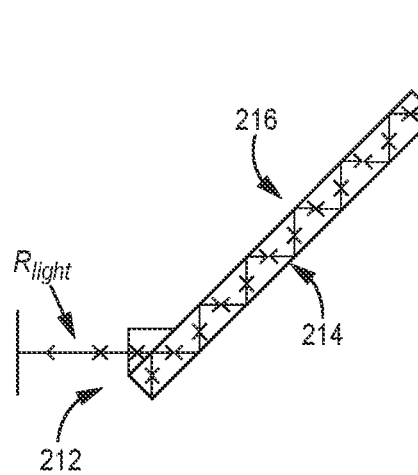
FIG. 4A is a side view ray trace diagram of a center ray reflecting through the rectangular window of FIG. 3.
Figure 4B:
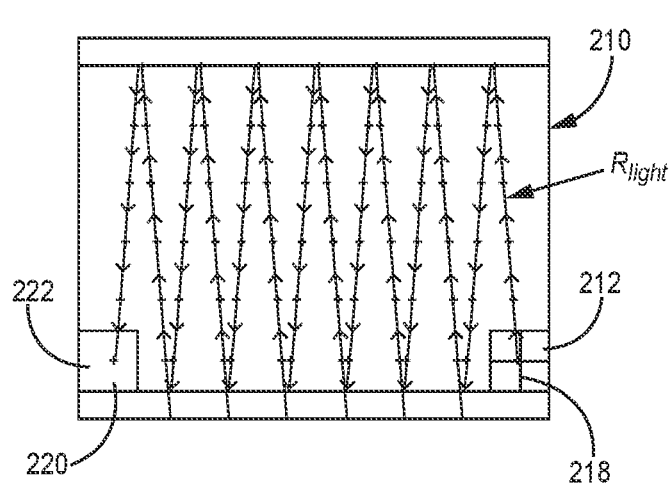
FIG. 4B is a front view ray trace diagram of a center ray reflecting through the rectangular window of FIG. 3.
Figure 4C:
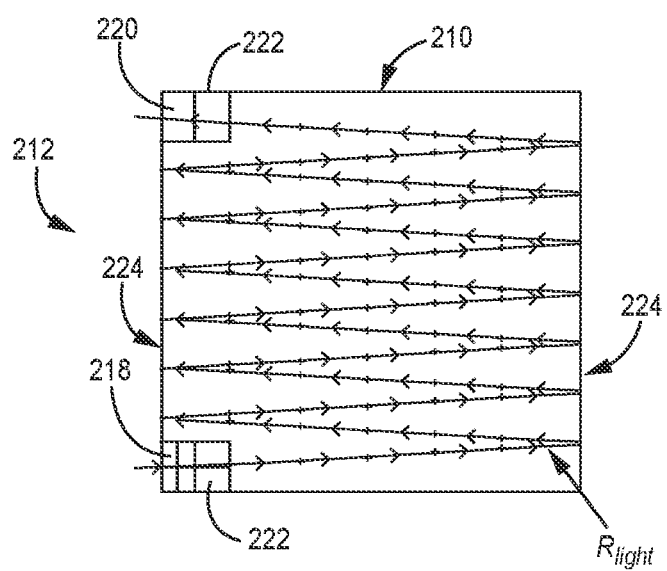
FIG. 4C is a top view of a center ray trace diagram of a center ray reflecting through the rectangular window of FIG. 3.

FIG. 4A is a side view ray trace diagram of a ray $R_{light}$ reflecting within window 210. FIG. 4B is a front view ray trace diagram of the ray $R_{light}$ of FIG. 4A. FIG. 4C is a top view of a center ray trace diagram of the ray $R_{light}$ of FIG. 4A. FIGS. 4A-4C will be discussed together.

FIGS. 4A-4C depict the paths of a ray $R_{light}$ reflecting within window 210. FIG. 4A depicts ray $R_{light}$ reflecting between outer surface 214 and inner surface 216. Ray $R_{light}$ travels along the path shown in FIG. 4A until reaching a polished edge 224, and is then reflected back along the path shown in FIG. 4A until reaching the other polished edge 224. In this way, ray $R_{light}$ completes the path shown in FIGS. 4B-4C by completing multiple paths shown in FIG. 4A, and polished edges 224 allow ray $R_{light}$ to reflect across window 210 along the path shown in FIGS. 4B-4C.

Figure 5A:
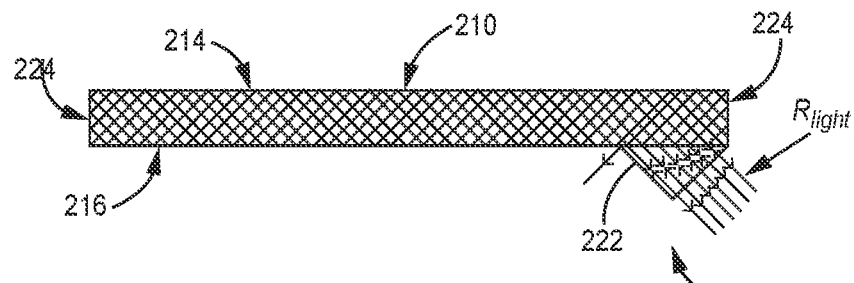
FIG. 5A is a side view ray trace diagram of a contamination detection zone of the rectangular window of FIG. 3.
Figure 5B:
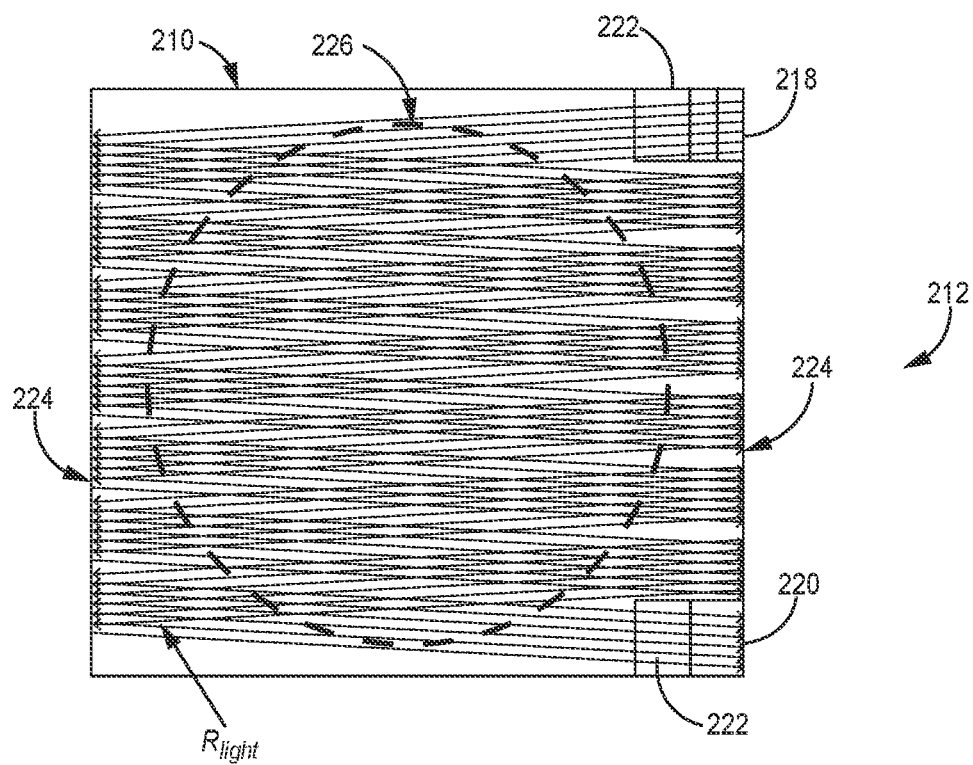
FIG. 5B is a top view ray trace diagram of a contamination detection zone of the rectangular window of FIG. 3.

FIG. 5A is a side view ray trace diagram of rays $R_{light}$ within window 210. FIG. 5B is a top view ray trace diagram of contamination detection zone 226. FIGS. 5A-5B will be discussed together.

FIGS. 5A and 5B show multiple rays $R_{light}$ traveling along the paths illustrated in FIGS. 4A and 4B, respectively. In this way, contamination sensor 212 can assess a level of contamination across contamination detection zone 226. Rays $R_{light}$ make up a collimated light beam which is emitted by source 218.

Figure 6:
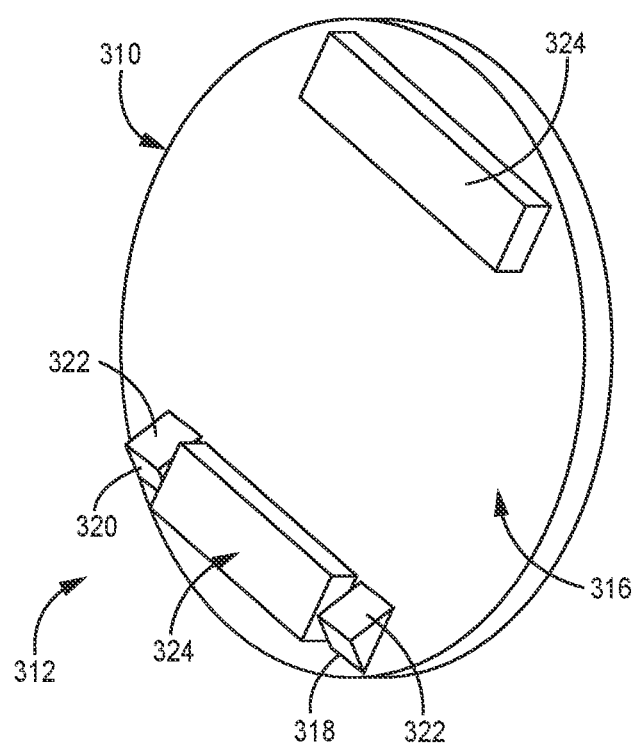
FIG. 6 is a perspective view of a circular window with two rectangular blocks and two prisms.

FIG. 6 is a perspective view of a contamination sensor 312 on window 310. Window 310 includes outer surface 314 (shown in FIGS. 7A-7B) and inner surface 316. Contamination sensor 312 includes source 318, detector 320, prisms 322, and blocks 324. In the example depicted in FIG. 6, contamination sensor 312 includes two prisms 322 and two blocks 324. Contamination sensor 312 can include a controller (not shown).

In the depicted example, window 310 is a circular window. As described in more detail below, window 310 can be any shape. Prisms 322 are triangular glass prisms. Blocks 324 are rectangular glass blocks which are optically polished.

Contamination sensor 312 within window 310 operates in substantially the same way as described above in reference to FIG. 1. Blocks 324 operate in substantially the same way as polished edges 224 (as described above in reference to FIGS. 4A-4C). Because blocks 324 are polished, blocks 324 reflect rays $R_{light}$ (shown in FIGS. 7A-7B), thereby keeping rays $R_{light}$ within window 310. Blocks 324 allow window 310 to be mounted while still allowing the TIR of rays $R_{light}$ within window 310.

FIG. 7A is a side view ray trace diagram of a ray $R_{light}$ reflecting within window 310. FIG. 7B is a top view ray trace diagram of a ray $R_{light}$ reflecting within window 310. FIGS. 7A-7B will be discussed together. FIG. 7A depicts ray $R_{light}$ reflecting between outer surface 314 and inner surface 316. As described above with respect to FIGS. 4A-4C, ray $R_{light}$ travels along the path shown in FIG. 7A until reaching a polished surface, which in this example is a block 324, and then is reflected back towards the other block 324. In this way, ray $R_{light}$ completes the path shown in FIG. 7B by completing multiple paths shown in FIG. 7A, and blocks 324 allow ray $R_{light}$ to reflect across window 310 along the path shown in FIG. 7B.

Any of the above-described contamination sensors can include multiple sets of sources, detectors, prisms, and, if necessary, blocks. For example, contamination sensor 212 can include two sources 218, two detectors 220, and four prisms 222. Contamination sensor 312 can include two additional sources 318 and two additional detectors 320, along with four additional prisms 322 and four additional blocks 324, on either side of the depicted components in contamination sensor 312. These examples can allow the contamination sensor to monitor a greater portion of the window. Additionally or alternatively, this can provide redundancy to the contamination sensor by having the contamination detection zones of multiple sources and detectors at least partially overlap. In the case of designing redundancies, the controller can be configured to determine redundant signals (for example, two detectors communicating reflectance data which shows contaminants on the outer surface) and consolidate the redundant signals.

Figure 8:
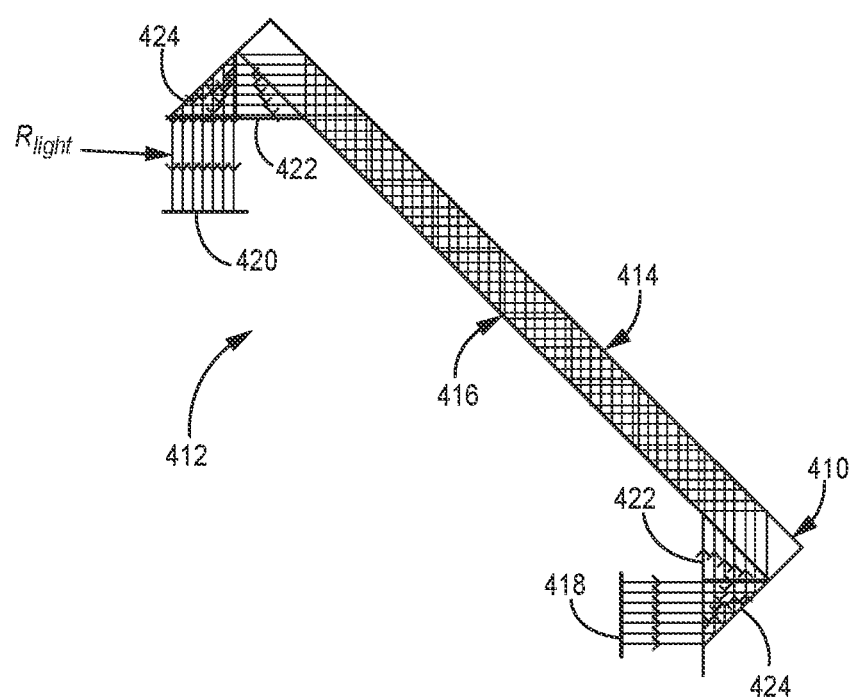
FIG. 8 is a side view ray trace diagram of another example of light rays reflecting through a window.

FIG. 8 is a side view ray trace diagram of rays $R_{light}$ reflecting through window 410 via contamination sensor 412. Window 410 has an outer surface 414 and an inner surface 416. Contamination sensor 412 includes source 418, detector 420, primary prisms 422, and secondary prisms 424. In the example depicted in FIG. 8, contamination sensor 412 includes two primary prisms 422 and two secondary prisms 424. Secondary prisms 424 can have the same size, shape, and other attributes as primary prisms 422.

Contamination sensor 412 within window 410 operates in substantially the same way as described above in reference to FIG. 1. Primary prisms 422 can operate in substantially the same way as prisms 22. A first secondary prism 424 can receive rays $R_{light}$ from source 418 and cause rays $R_{light}$ to undergo TIR within the first secondary prism 424. Rays $R_{light}$ can then pass into a first primary prism 422, and the first primary prism 422 can thereby direct rays $R_{light}$ from source 418 into window 410. A second secondary prism 424 can receive rays $R_{light}$ from a second primary prism 422 and cause rays $R_{light}$ to undergo TIR within the second secondary prism 424. Rays $R_{light}$ can then be received by detector 420, and the second primary prism 422 can thereby direct rays $R_{light}$ from window 410 to detector 420. The embodiment depicted in FIG. 8 can allow the contamination sensor 412 to be more compact than other embodiments.

Implementing a contamination sensor as described above provides several advantages. The components of the contamination sensor can be small to avoid obscuring a large area of the window. The number of components required is low, and the components are readily available and inexpensive. Retrofitting measures will vary based on the chosen embodiment, but are generally minimal and low-cost. Redundancies can be easily incorporated into the contamination sensor, improving reliability. Finally, the chosen mechanisms allow a much larger portion of a window to be monitored than conventional contamination detection systems.

The terms "about" and "approximately" are intended to include the degree of error associated with measurement of the particular quantity based upon the equipment available at the time of filing the application.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A contamination sensor for an optical sensor observation window, the contamination sensor comprising:
   a source which is configured to emit a collimated light beam at an incident angle that is greater than a critical angle of an interface between a fluid and the optical sensor observation window, wherein the optical sensor observation window is made from a material having a refractive index greater than the refractive index of the fluid and the source is configured to communicate emission data about the collimated light beam with a controller;
   a first prism in contact with the optical sensor observation window, wherein the first prism is configured to direct the collimated light beam into the optical sensor observation window such that the collimated light beam reflects between a first surface of the optical sensor observation window and a second surface of the optical sensor observation window within a contamination detection zone of the optical sensor observation window;
   a second prism in contact with the optical sensor observation window and located along a beam path of the collimated light beam, wherein the second prism is configured to receive the collimated light beam after the collimated light beam has been reflected between the first surface of the optical sensor observation window and the second surface of the optical sensor observation window within the contamination detection zone of the optical sensor observation window;
   a detector, wherein the detector is configured to receive the collimated light beam from the second prism and communicate reflectance data about the collimated light beam with the controller; and
   the controller, wherein the controller is configured to calculate an emission/detection ratio which is defined by a difference between an amount of light that is emitted by the source and an amount of light that passes from the source to the detector by a total internal reflectance of the optical sensor observation window.

2. The contamination sensor of claim 1, wherein the optical sensor observation window is a rectangular window having polished edges.

3. The contamination sensor of claim 1, wherein the contamination sensor further comprises a first rectangular glass block and a second rectangular glass block, and the first prism is configured to direct the collimated light beam into the optical sensor observation window such that the collimated light beam reflects between the first rectangular glass block and the second rectangular glass block within a contamination detection zone of the optical sensor observation window.

4. The contamination sensor of claim 3, wherein the optical sensor observation window is a circular window.

5. The contamination sensor of claim 1, wherein the collimated light beam is a laser.

6. The contamination sensor of claim 1, wherein the source is one of a light-emitting diode, a filament, and a lamp.

7. The contamination sensor of claim 1, wherein the controller is further configured to periodically calculate the emission/detection ratio.

8. The contamination sensor of claim 1, wherein the controller is further configured to calculate a contamination index, wherein the contamination index is the difference between a threshold value and the emission/detection ratio.

9. The contamination sensor of claim 8, wherein the controller is further configured to trigger an alert if the contamination index is greater than zero, wherein the contamination index having a value greater than zero is indicative of a level of contamination on a surface of the optical sensor observation window within the contamination detection zone.

10. The contamination sensor of claim 8, wherein the controller is further configured to carry out instructions from a user that include a selection of the threshold value.

11. The contamination sensor of claim 8, wherein the controller is further configured to periodically calculate the contamination index.

12. The contamination sensor of claim 1, wherein the optical sensor observation window is an observation window of an aircraft and the fluid is air.

13. The contamination sensor of claim 1, wherein the source is a first source, the collimated light beam is a first collimated light beam, the contamination detection zone is a first contamination detection zone, and the detector is a first detector, and further comprising:
   a second source, wherein the second source is configured to emit a second collimated light beam at the incident angle;
   a third prism in contact with the optical sensor observation window, wherein the third prism is configured to direct the second collimated light beam into the optical sensor observation window such that the second collimated light beam reflects between the first surface of the optical sensor observation window and the second surface of the optical sensor observation window within a second contamination detection zone of the optical sensor observation window;
   a fourth prism in contact with the optical sensor observation window and located along a beam path of the second collimated light beam, wherein the fourth prism is configured to receive the second collimated light beam after the second collimated light beam has been reflected between the first surface of the optical sensor observation window and the second surface of the optical sensor observation window within the contamination detection zone of the optical sensor observation window; and a second detector, wherein the second detector is configured to receive the second collimated light beam from the fourth prism and communicate reflectance data about the second collimated light beam with the controller;

wherein the controller is configured to calculate an amount of light that passes from the second source to the second detector by the total internal reflectance of the optical sensor observation window.

14. The contamination sensor of claim 13, wherein the first contamination detection zone at least partially overlaps the second contamination detection zone, thereby providing redundancy to the contamination sensor.

15. A system for detecting contaminants on an optical sensor observation window, the system comprising:
the optical sensor observation window; and
a contamination sensor, wherein the contamination sensor comprises the contamination sensor of claim 1.

16. The system of claim 15, wherein the optical sensor observation window is a rectangular window having polished edges.

17. The system of claim 15, wherein the contamination sensor further comprises a first rectangular glass block and a second rectangular glass block, and the first prism is configured to direct the collimated light beam into the optical sensor observation window such that the collimated light beam reflects between the first rectangular glass block and the second rectangular glass block within a contamination detection zone of the optical sensor observation window.

18. A method of detecting contaminants on an optical sensor observation window, the method comprising:
emitting, with a source, a collimated light beam at an incident angle that is greater than a critical angle of an interface between a fluid and the optical sensor observation window, wherein the optical sensor observation window is made from a material having a refractive index greater than the refractive index of the fluid;

directing, with a first prism in contact with the optical sensor observation window, the collimated light beam;

reflecting the collimated light beam between a first surface of the optical sensor observation window and a second surface of the optical sensor observation window within a contamination detection zone of the optical sensor observation window;

receiving, with a second prism in contact with the optical sensor observation window and located along a beam path of the collimated light beam, the collimated light beam which has been reflected between the first surface of the optical sensor observation window and the second surface of the optical sensor observation window within the contamination detection zone of the optical sensor observation window;

receiving, with a detector, the collimated light beam from the second prism;

communicating, between the source and a controller, emission data about the collimated light beam;

communicating, between the detector and the controller, reflectance data about the collimated light beam which has been reflected within the contamination detection zone; and calculating, with the controller, an emission/detection ratio which is defined by a difference between an amount of light that is emitted by the source and an amount of light that passes from the source to the detector by a total internal reflectance of the optical sensor observation window.

19. The method of claim 16, further comprising calculating, with a processor of the controller, a contamination index, wherein the contamination index is the difference between a threshold value and the emission/detection ratio.

20. The method of claim 16, further comprising triggering an alert with the controller if the contamination index is greater than zero, wherein the contamination index having a value greater than zero is indicative of a level of contamination on a surface of the optical sensor observation window in the contamination detection zone.

* * * * *